Figure 1:
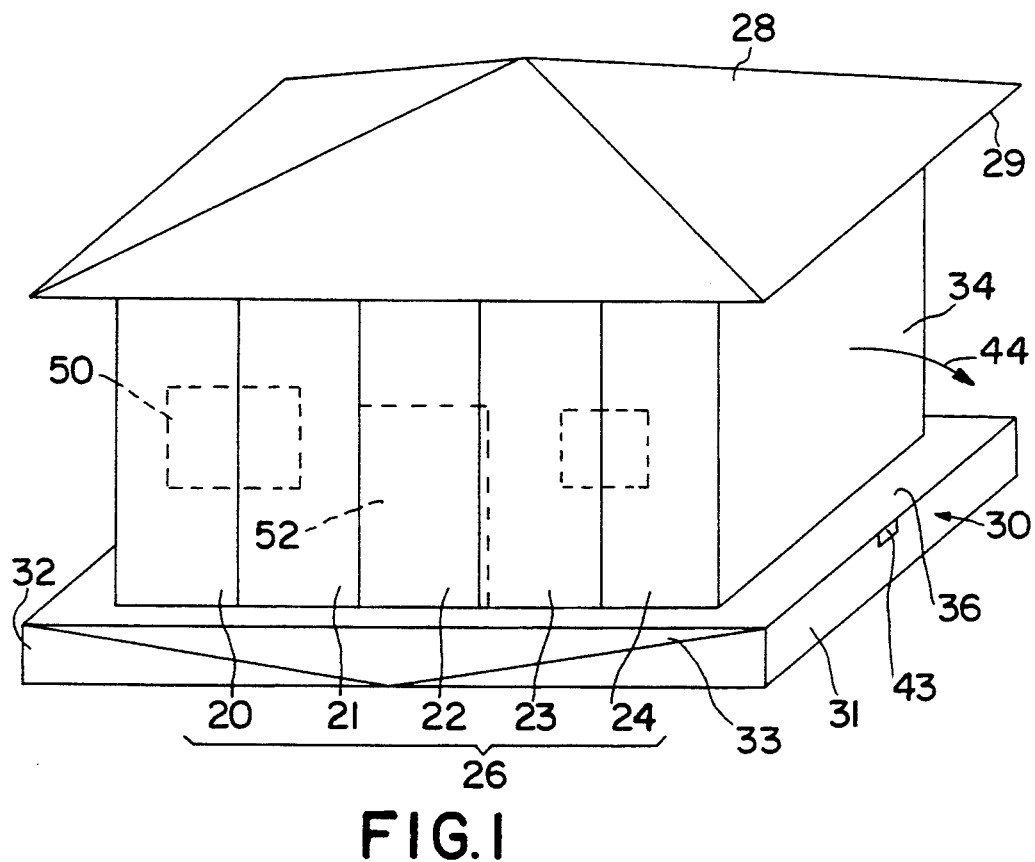

United States Patent [19]
Schmitz et al.

[11] Patent Number: 5,352,121
[45] Date of Patent: Oct. 4, 1994

[54] DEMONSTRATION DEVICE

[76] Inventors: Karl-Weiner Schmitz, Im Rheinwinkel 20, D-5000 Köln 90; Manfred Bergfelder, Gimborner Weg 3, D-5000 Köln 80, both of Fed. Rep. of Germany

[21] Appl. No.: 730,980
[22] PCT Filed: Feb. 1, 1990
[86] PCT No.: PCT/DE90/00064
§ 371 Date: Apr. 8, 1992
§ 102(e) Date: Apr. 8, 1992
[87] PCT Pub. No.: WO90/10923
PCT Pub. Date: Sep. 20, 1990

[30] Foreign Application Priority Data
Mar. 9, 1989 [DE] Fed. Rep. of Germany ... 8902865[U]

[51] Int. Cl.$^5$ .............................................. G09B 25/02
[52] U.S. Cl. .................................... 434/403; 434/107
[58] Field of Search ............... 434/72, 73, 79, 299, 434/107; 446/92, 85, 4

[56] References Cited
U.S. PATENT DOCUMENTS

| | | | |
|---|---|---|---|
| 499,512 | 6/1893 | Brower | 446/85 |
| 1,344,451 | 6/1920 | Richard | 446/85 |
| 1,736,134 | 11/1929 | Rutherford | 446/85 X |
| 2,110,990 | 3/1938 | Forbes | 446/85 X |
| 2,315,463 | 3/1943 | Tingley et al. | 434/72 |
| 2,589,588 | 3/1952 | Winnemore | 446/85 |
| 2,754,620 | 7/1956 | Gilbert et al. | 446/85 |
| 3,577,672 | 5/1971 | Nutting | 446/85 |
| 4,886,273 | 12/1989 | Unger | 446/92 X |
| 5,021,021 | 6/1991 | Ballard | 446/92 |

FOREIGN PATENT DOCUMENTS

| | | | |
|---|---|---|---|
| 2274095 | 1/1976 | France | 434/72 |
| 414462 | 6/1947 | Italy | 446/85 |

*Primary Examiner*—Gene Mancene
*Assistant Examiner*—Jeffrey A. Smith
*Attorney, Agent, or Firm*—Eckert Seamans Cherin & Mellott

[57] ABSTRACT

A demonstration device in the form of a single-story house comprises a body (26), a roof (28) and a base slab (30). The body (26) is composed of a number of prism-shaped building blocks (20-24) whose height is equivalent to the height of a story. Each body building block has an oblong, narrow lower side or base (42); when placed side by side, the blocks form the essentially cuboid house body (26) with the area of the base of the house. The roof (28) is a building block with sloping roof surfaces and a base surface (29) whose area is at least as large as that of the base of the house. In the normal state, the base slab (30) forms a supporting surface (36) for the body building blocks (20-24), the area of which is at least as large as the base area of the body; (b) in the normal state the base slab (30) is composed of at least two prism-shaped components (31-33) which have sloping surfaces and which touch one another at contact surfaces and which can be moved away from one another, out of their normal state positions, having an effect on the supporting surface (36) and causing the body building blocks (20-24) to fall over.

15 Claims, 2 Drawing Sheets

DEMONSTRATION DEVICE

The invention relates to a demonstration device. Devices of this type have, on the one hand, a play function; they are intended to stimulate the player to handle them, to enjoy touching and using them. On the other hand, they are also intended to communicate a message, particularly in the form of educational content. This results from the special design of the demonstration device, and can be varied within a certain range of educational messages having similar objectives.

The educational message communicated by play with the demonstration device should be as clear as possible; at the same time, however, it should not be the primary initial objective. Playing with the device should have the effect of communicating a grasp of the educational content and thus the message in other and possibly better ways than would be possible by means of a spoken explanation, a written description or a drawing dealing with the same educational content. When the teacher uses the demonstration device, he/she can communicate the associated messages to the learner better than would otherwise be possible. The demonstration device in the hands of the teacher facilitates the teacher's presentation; it compels the presenter to refer to the elements of the demonstration device, with the result that the content to be communicated is discussed; the demonstration device thus functions as a presentation plan. When the learner uses the demonstration device he/she can gain a physical grasp of the message, which reinforces the learning effect. A demonstration device of the type described at the outset thus makes use of the empirical observation that an exclusively spoken communication of educational content, communication using exclusively optical means or communication of knowledge using a combination of speech and optical means are less likely to result in lasting retention by the learner than learning which involves physical, bodily grasping of the content with the hands, the communication of a message through play, i.e. haptic learning.

On the basis of this, the problem of the invention was to describe a demonstration device in the form of a house with which the necessity of protection, in particular in the form of insurance policies, can be explained and vividly demonstrated to someone who wishes to build or purchase a house.

This problem is solved by means of a demonstration device in the form of a single-story house comprising a body, a roof and a base slab. The body is composed of a number of prism-shaped building blocks whose height is equivalent to the height of the storey. Each body building block has an oblong, narrow lower side or base; when placed side by side, the blocks form the essentially cuboid body with the area of the base of the house. The roof is a building block with sloping roof surfaces and a base surface whose area is at least as large as that of the base of the house. The base slab: (a) forms, in the normal state, a supporting surface for the body building blocks the area of which is at least as large as the base area of the body; (b) is composed in the normal state of at least two prism-shaped components which have sloping surfaces and which touch one another at contact surfaces; and (c) two components of the base slab can be moved away from one another, out of their normal state positions, having an effect on the supporting surface and causing the body - building blocks to fall over.

The building blocks forming the body, of which at least three and preferably five are provided, symbolize the preconditions which must be fulfilled for the construction or purchase of a house, such as a regular income, mortgages and/or loans from a building society, employer loans etc. The roof building block rests on the body building blocks, which form the essentially cuboid body of the house. The base slab consists of several components, specifically a minimum of two components. Like the body building blocks, the components of the base slab are prism-shaped. "Prism-shaped" is understood here to mean a body in the form of a straight prism, i.e. a body with a regular base, constant cross-sectional areas and walls perpendicular to the base surface. In the normal state the components of the base slab form a supporting surface for the body building blocks, which are placed side by side to form the body of the house. Two components can be moved out of their normal state positions, away from one another in opposite directions; as a result the position of the supporting surface is changed and the building blocks fall over.

The act of pulling two of the at least two components of the base slab apart symbolizes strokes of fate in the life of the builder or purchaser of the house. The builder/purchaser should see that the foundations on which the house is built, i.e. the base slab, need to be stable and protected to ensure the stability of the house built upon them, so that it will not begin to sway even in the event of physical shocks or strokes of fate.

The domino-effect in which the individual building blocks of the base slab fall over, and the resulting collapse of the roof, can be improved by means of an advantageous design of the bases of the individual building blocks and by minimizing the friction on the contact surfaces between the adjacent surfaces and the lower surface of the roof block.

In the demonstration, the individual body building blocks are first described; i.e. the demonstrator explains that to build a house one needs bricks, which form the body of the house when they are assembled. The building blocks can be provided with different labels, with expressions such as "mortgage", "loan", "income", "employer loan" etc. However, they can also be labelled in other ways, for example with references to the individual agents and work necessary to build or purchase a house; e.g. builders or building contractors, estate agents etc. In both cases, the objective is to demonstrate to the potential house purchaser or house builder, that the individual building blocks which are needed for the future house can cease to exist or become uncertain (unsteady). For example, the buyer's/builder's income could stop, there could be problems with a loan from an employer because of inability to continue employment, the building company or building contractor could become bankrupt etc. These problems are demonstrated by pulling two components of the base slab away from one another, which changes the supporting surface on which the building blocks rest in such a way that they fall over, with the result that the roof also collapses.

In another embodiment, the components of the base slab can be labelled, instead of the building blocks of the body of the house. For this purpose, the base slab can be divided into the necessary number of components for the number of expressions required.

In a further development it has proved to be advantageous to make the bases of the individual body building blocks uneven and to keep the area on which they actually rest as small as possible. This makes the body building blocks unsteady when they are resting on their bases, and even small jolts can cause them to fall over. In achieving this effect, one strives to minimize the deviation from the actual cuboid form, so that an unbiased observer is practically unable to notice the deviation from a flat base. For example, the base can be given the form of a cylindrical section flattened in the central area, or can be sloped like the sides of a dyke.

In another further development the large side surfaces of the building blocks which touch face to face when the blocks are assembled to form the house body are made as smooth as possible in order to minimize the coefficient of friction between the adjacent blocks. This has the effect of minimizing the cohesion between the blocks so that the sliding friction which occurs of necessity when the adjacent blocks fall over like a row of dominoes hinders the falling process as little as possible.

In a further development it has proved to be very advantageous to provide repulsive means, in particular permanent magnets of the same polarity, concealed in corresponding locations of the body building blocks so that they are opposite one another when the blocks are assembled. These means only exert a small repulsive force which is not on its own sufficient to move the body building blocks far enough apart to become apparent or to cause the blocks to fall over. The primary function of the permanent magnets is rather to provide compensation, at least, for the friction losses.

In the assembled state the base slab preferably has a rectangular and in particular a square base. In a preferred embodiment its height is approx. 10 mm. In the normal state of the base slab the supporting surface is either level or comprises essentially two V-shaped components sloping towards one another at a very shallow angle. In the former case the building blocks of the base slab are cuboid, in the latter they are prismshaped and have an angled lower surface, the angle of which corresponds to the slope of the supporting surface or which forms a V-shaped slope.

The dimensions of the base slab are at least as large as those of the base of the body of the house. Preferably, however, the base slab is larger than the body and projects from the latter on all sides. The base slab preferably has the same dimensions as the base of the roof building block.

The upper surface of the base slab can be slightly corrugated in order to improve or achieve the desired unsteady support for the building blocks. In addition, concealed permanent magnets can be provided in the base slab with corresponding permanent magnets of the same polarity provided in locations above the base of each body building block, thus reducing the stability of the individual building blocks without this being visible.

In a preferred embodiment the roof has the form of a pointed roof with a shallow slope, providing an aesthetically pleasing appearance in combination with the essentially square body of the house. The house is made of a suitable material, for example wood, plastic or metal. In an advantageous further development, the building blocks have on some of their outward-facing surfaces representations of windows, doors etc, in order to emphasise the impression of a house. These elements can be advantageously arranged so that the blocks must be assembled in a preordained order in order to obtain a complete window, a complete door etc. If this is done on the narrow end surfaces, the result is that the blocks must be assembled next to one another in a fixed, predetermined order, because the desired complete picture can only be obtained in that order and not in any other. Further features and advantages of the invention are revealed in the remaining claims and the following description of a sample embodiment, which should not be understood to be restrictive and which is explained with reference to the attached figures. These figures are as follows:

FIG. 1 A representation of the house in perspective.

Figure 2:
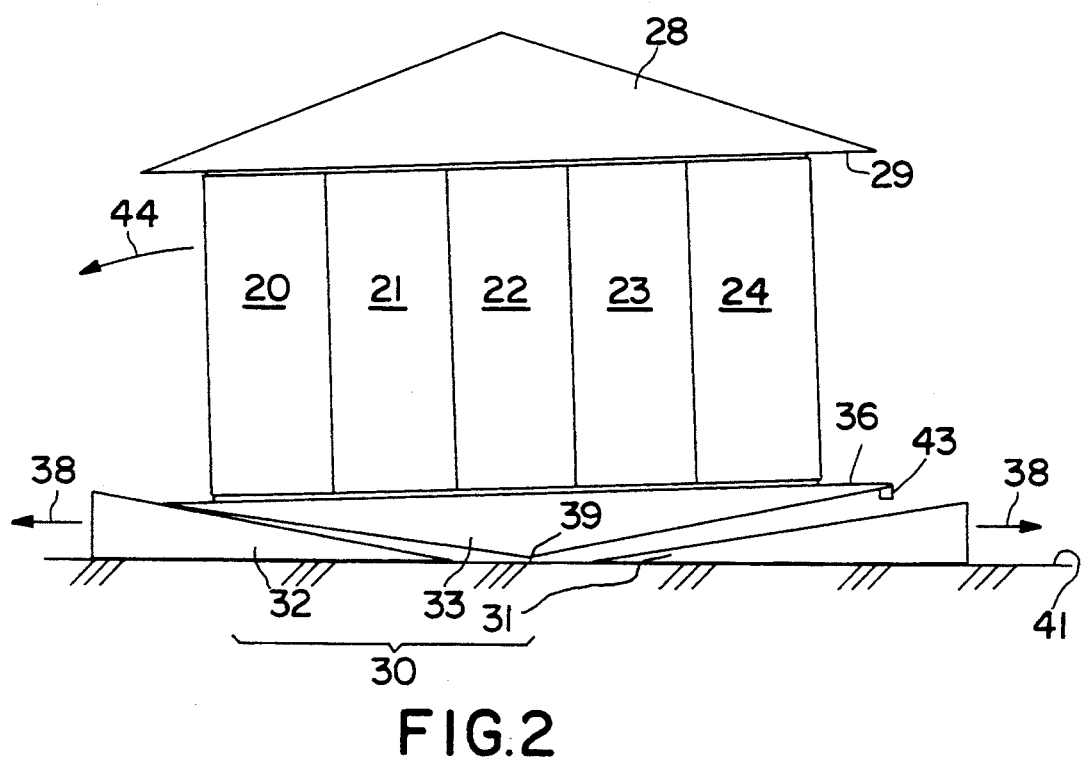

FIG. 2 A front view of the house shown in FIG. 1 showing the components of the base slab partially pulled apart to illustrate how the building blocks are tipped over.

Figure 3:
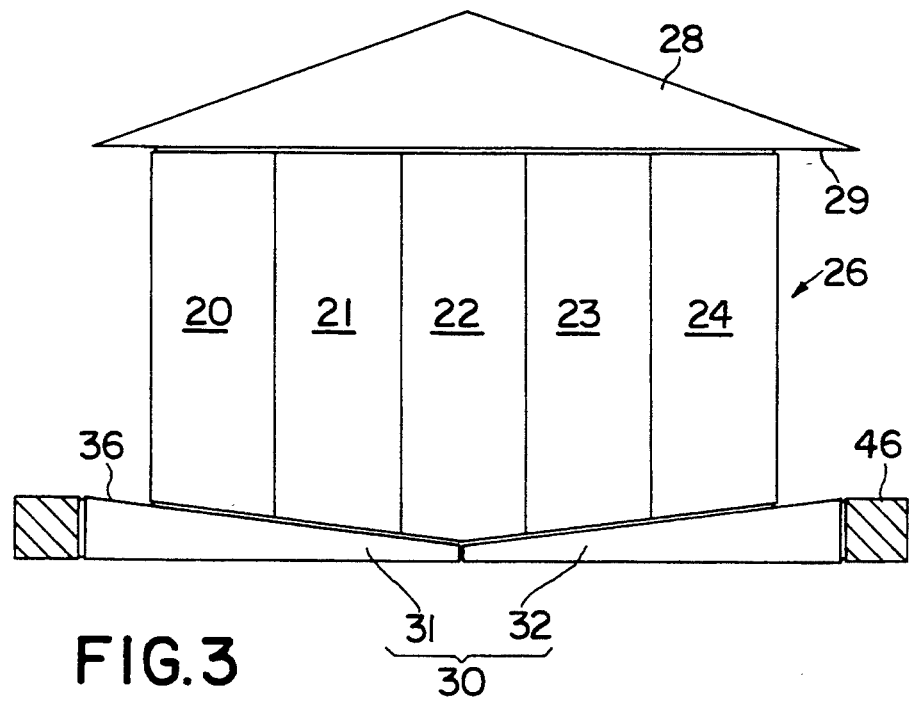

FIG. 3 A view as in FIG. 2 of a second sample embodiment with a two-component base slab.

Figure 4:
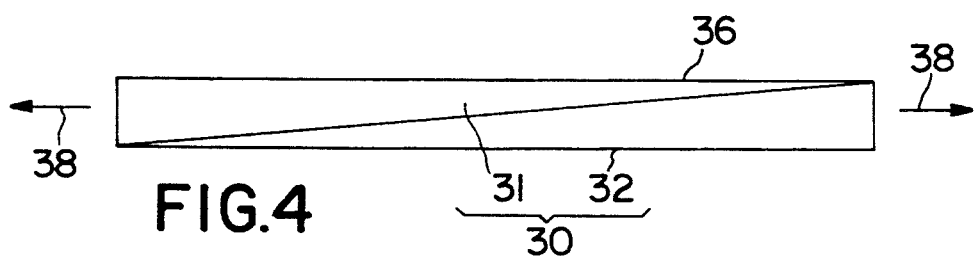

FIG. 4 A front view as in FIG. 3 of a base slab comprising two wedge-shaped components.

Figure 5:
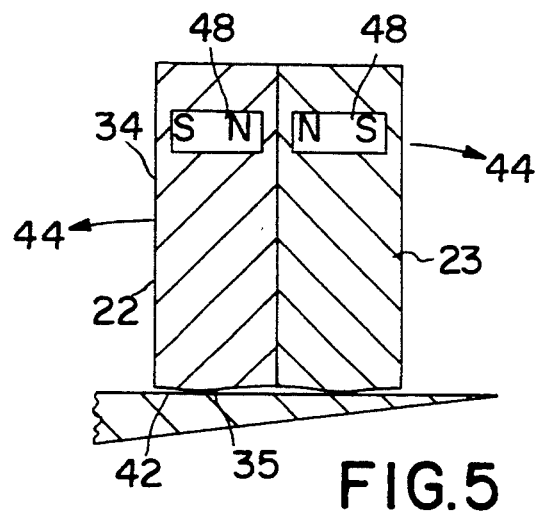

FIG. 5 A cross-section of two neighbouring body building blocks and a component of the base slab, through a plane running parallel to the front side (as in FIG. 2).

The demonstration device in the form of a single-storey house (bungalow) consists of a total of five cuboid building blocks (20–24) of the same size which together form the house body (26), and of a roof building block (28) and of a base slab (30). In the sample embodiment shown each of the body building blocks (20–24) has a base (42) 1.8 cm wide and 9 cm long; the height of building blocks (20–24) is 6 cm. More generally, each of the body building blocks (20–24) can have a base with a width between 1 and 3 cm. and a length between 5 and 12 cm., and each body building block (20–24) can also have a height between 5 and 12 cm. The building blocks (20–24) are made of metal, e.g. aluminium, but they can also be made of wood, plastic or similar. Their large side surfaces (34) touch one another. Assembled, they form the house body (26), which has a square base measuring 9×9 cm and the specified height of 6 cm. The height of the building blocks (20–24) corresponds to the height of a storey of a house in the demonstration device according to the invention.

The roof building block (28) has the form of a flat, four-sided pyramid with a square base (29) with the dimensions 11×11 cm. The base surface (29) projects 1 cm beyond the base of the house body (26) on all sides. The base slab (30) has the same square format as the base surface (29) of the roof building block (28) and is a few millimeters thick, in the sample embodiment shown in FIGS. 1 and 2 approx. 10 mm thick. It is preferably made of the same material as the building blocks (20–24 and 28). In the sample embodiments shown in FIGS. 1, 2 and 4, the base slab (30) is in its normal state a cuboid with a square base. In the sample embodiment shown in FIGS. 1 and 2 the base slab consists of three components (31, 32 and 33). The two identical components 31 and 32 are wedge-shaped and their base areas are each equivalent to one half of that of the base slab (30). Their cross-sections are right-angled triangles. The profile of the third component (33) is an isosceles triangle, and its upper surface forms the entire supporting surface (36) of the base slab (30). The two congruent acute angles in this component (33) are congruent to the acute angles at the tips of the other components (31, 32). In effect, component (33) is equivalent to two of the other components (31 or 32) joined together at their short leg ends.

If one pulls the first two components (31, 32) away from one another as indicated by the arrows (38) in FIG. 2, the foundation necessary to support the third component (33) is progressively removed. Then only the a lower edge of the third component (33) rests on a base (41), e.g. the surface of a table. If the first two components (31, 32) are pulled apart in the direction of the arrows, the third component (33) tilts over in the direction of the side which is most top-heavy; in any event, the third component (33) bearing the house body and roof is in an unstable condition, so that it must tilt over. The resulting tilting of the supporting surface (36) causes the building blocks (20–25) of the house body (26) to tilt over in the direction shown by the arrow (44), resulting in the collapse of the entire house, including the roof building block (28).

A further advantageous but not essential development is also shown in the sample embodiment in FIGS. 1 and 2: A guide (43) projects downwards in the area of the acutely-angled edges of component (33). In the sample embodiment shown this guide (43) is a short lug, but it can also have an longitudinal form running parallel to the plane of view and flattening out when it reaches the lower edge (39). The upper surfaces of each of the other two components (31, 32) are provided with corresponding grooves which are not shown in the figures. In the normal state, the guide engages in the groove ensuring a precise alignment of the three components (31, 32, 33). When the two components (31, 32) are pulled apart in the direction of the arrows (38), the guide (43) and the groove provide a guiding function which prevents the components from being pulled apart at an angle to the plane of view of FIG. 2.

In the sample embodiment shown in FIG. 3 the base slab (30) consists of two identical, prism-shaped components (31, 32) with a base in the form of a blunt wedge or, in a variant embodiment, the form of a wedge. As a result, the supporting surface (36) is not flat but consists of two surfaces of equal size sloping toward one another at an obtuse angle only a few degrees different from 180°. The result, as shown in FIG. 3, is that the two lectern-shaped components (31, 32) form a shallow channel. The base (42) of each of the building blocks (20–25) matches the course of this channel and is angled to match the angle of the supporting surface (36), so that the side surfaces (34) of the individual body building blocks (20–25) are vertical. FIG. 3 shows an uneven number of building blocks, and the central building block (23) is thus angled in two directions like an inverted rooftop and matching the angles of the flat channel formed by the supporting surface (36) of the base slab (30).

If one pulls the two components (31, 32) away from one another in the directions shown by the arrows (38), the house also collapses.

In the sample embodiment shown in FIG. 4, the base slab (30) is also cuboid in the normal state shown, as in the embodiment in FIGS. 1 and 2. In contrast to this embodiment, however, it consists of only two components (31, 32), which are identical and which have a surface area corresponding to the supporting surface (36). The two components (31, 32) are identical and have the form of prisms with the base shape of a right-angled triangle.

In the sample embodiments shown in FIGS. 1, 2 and 4, the wedge surfaces of the components (31–33) of the base slab (30) touch one another in the normal state and the wedge-shaped components are stacked facing in opposite directions. In contrast to this, only the narrow end surfaces of the two components (31, 32) in the embodiment shown in FIG. 3 touch one another in the normal state, at the narrower blunt end of the wedges of the components (31, 32).

In a preferred further development it is proposed that the base slab (30) should be complemented by a rectangular frame (46) which can be lowered over the roof building block (28) of the house. In the normal state, this frame (46) then encloses the base slab (30) so that it is not possible to separate or disengage its components (31–33) in the direction of the arrows (38). This frame can symbolize an insurance policy which makes it impossible to separate the components of the base slab. In an advantageous further development, the upper surface of the frame (46) can be provided with a fence surrounding the entire house; this fence is not shown.

As FIG. 5 shows, the bases (42) of the individual body building blocks (20–24) is slightly uneven; in the sample embodiment shown it has the shape of a dyke, comprising two sloping surfaces at angle of 3° to the horizontal with a supporting surface (35) in the middle, which is only 2 mm wide. This makes it particularly easy for the body building blocks (20–24) to tilt in the direction of the arrows (44), diagonally to their side surfaces. The entire construction is designed so that the five body building blocks (20–24), which are stacked touching one another like a row of dominoes, can relatively easily be tipped in the direction of the arrows (44) in the event of jolts or vibrations. In order to make tilting as easy as possible, the contacting side surfaces (34) of the body building blocks (20–24) should be as smooth as possible and executed so that the coefficient of friction between adjoining surfaces (34) is as low as possible. In the case of body building blocks made out of wood, the side surfaces (34) are painted; in the case of blocks made out of aluminium they are provided with a polished, anodized or similar finish. In addition to this, in order to ensure that the body building blocks (20–24) do not adhere to one another when assembled to form the house body (26), e.g. by adhesion, additional measures are implemented to facilitate further the lateral falling-over of the individual body building blocks (20–24), and at least to minimize or eliminate the friction between the side surfaces (34) of the body building blocks (20–24) as they rub against one another when they are falling over. As shown in FIG. 5, rod-shaped permanent magnets (48) not visible from outside are embedded in the body building blocks (20–24) so that the magnets (48) are at right angles to the plane of the side surface (34) and the same poles face one another (N=North, S=South) thus exerting a repulsive force on one another. However, this repulsive force is so small that it only effects a slight counteraction of the friction and is not large enough so that the building blocks shown in FIG. 5 can be pushed apart and knocked over by magnetic repulsion alone. With reference to FIG. 3, the base slab 30 is provided with a frame 46 surrounding it on all sides and preferably of the same height all round.

With reference to FIG. 1, the building blocks 20, 21, 22, 23 and 24 can have on some of their outward-facing surfaces, representations of windows 50, doors 52, and the like, in order to emphasize the impression of a house.

We claim:

1. Demonstration device in the form of a single-story house for communicating messages; comprising:

a body, a roof and a substantially planar base having mutually assembled and disassembled states, wherein the body comprises a plurality of prism-shaped building blocks abutting against one another in side by side relation in the assembled state;

each building block having an oblong, narrow lower surface;

the roof defining sloping roof surfaces, the base comprising at least two prism-shaped components, each prism-shaped component having a sloping surface and having a contact surface for abutting against the contact surface of the other prism-shaped component in the assembled state;

the sloping surfaces of the prism-shaped components mutually defining a supporting surface for the base in the assembled state for supporting the lower surfaces of the building blocks of the body;

wherein the prism-shaped components can be moved away from one another, from the assembled state to the disassembled state, having an effect on the supporting surface of the base in the assembled state and causing an occurrence of the building blocks of the body to fall over, such occurrence of the building blocks falling over thereby communicating one of said messages.

2. Demonstration device as claimed in claim 1, wherein the prism-shaped components comprise two lectern-shaped components which are identical in shape and whose base area corresponds to one half that of the supporting surface.

3. Demonstration device as claimed in claim 1, wherein the prism-shaped components while disposed in the assembled state define a rectangular box shape.

4. Demonstration device as claimed in claim 3, wherein the base comprises two identical wedge-shaped components.

5. Demonstration device as claimed in claim 3, wherein the prism-shaped components comprise a first component that has an upper surface defining the supporting surface and has a cross-section defining an obtuse isosceles triangle.

6. Demonstration device as claimed in claim 1, characterized by the fact that the base is provided with a frame surrounding it on all sides and generally of the same height all around.

7. Demonstration device as claimed in claim 1, wherein the lower surface of each building block has a surface having the form of a cylindrical section flattened in a central area.

8. Demonstration device as claimed in claim 1, wherein the building blocks have side surfaces abutting against one another in the assembled state; the side surface generally being smooth, reducing the friction with one another.

9. Demonstration device as claimed in claim 1, characterized by the fact that the base slab has a thickness of from 5 to 10 min. and that its supporting surface projects about 1 cm. from the base area of the house body on all sides.

10. Demonstration device as claimed in claim 1, characterized by the fact that the base has a surface defining a shallow channel.

11. Demonstration device as claimed in claim 1, further comprising permanent magnets, provided in corresponding locations in the building blocks; wherein the permanent magnets of the same polarity are positioned adjacent one another while the building blocks are positioned in the assembled state.

12. Demonstration device as claimed in claim 1, wherein the roof comprises a single piece defining a pyramid.

13. Demonstration device as claimed in claim 1, characterized by the fact that the body building blocks have a base with a width between 1 and 3 cm and a length between 5 and 12 cm and that the height of the body building blocks is between 5 and 12 cm.

14. Demonstration device as claimed in claim 1, wherein the lower surface of each building block is uneven for increasing the likelihood that, in the assembled state, the building blocks will fall over in response to the prism-shaped components being moved away from one another from the assembled state to the disassembled state, wherein the falling building blocks communicate said one message to a house builder or purchaser which concerns the need for a stably protected foundation.

15. Demonstration device as claimed in claim 1, wherein the building blocks have outward-facing surfaces arranged and adapted to be provided with labels, with expressions such as insurance, income, mortgage, loan, and the like, which communicate another of said messages to a house builder or purchaser, said other message concerning the preconditions that must be fulfilled before the construction or purchase of a house.

* * * * *